United States Patent [19]

Greenwood et al.

[11] Patent Number: 4,567,023

[45] Date of Patent: Jan. 28, 1986

[54] MULTIPLE-STAGE REACTOR SYSTEM FOR A MOVING CATALYST BED

[75] Inventors: Arthur R. Greenwood, Niles; Jeffrey E. Burgard, Lombard; Roger L. Throndson, Elk Grove Village, all of Ill.

[73] Assignee: UOP Inc., Des Plaines, Ill.

[21] Appl. No.: 584,207

[22] Filed: Feb. 27, 1984

[51] Int. Cl.$^4$ .................. B01J 8/12; C10G 35/10
[52] U.S. Cl. .................. 422/192; 208/169; 208/173; 422/216; 422/218; 422/219
[58] Field of Search .............. 422/192, 216, 218, 219, 422/213; 208/169, 173, 176

[56] References Cited

U.S. PATENT DOCUMENTS

| | | | |
|---|---|---|---|
| Re. 23,638 | 3/1953 | Peters | 422/218 X |
| 2,518,842 | 8/1950 | Weber | 422/216 X |
| 2,683,654 | 7/1954 | Bergman | 422/218 |
| 2,818,325 | 12/1957 | Kassel | 208/169 X |
| 2,897,138 | 7/1959 | Ardern | 422/216 X |
| 2,952,623 | 9/1960 | McClure | 422/216 X |
| 2,997,374 | 8/1961 | Lauender et al. | 422/218 |
| 3,098,815 | 7/1963 | Daily | 422/216 X |
| 3,652,231 | 3/1972 | Greenwood et al. | 422/216 X |
| 3,692,496 | 9/1972 | Greenwood et al. | 422/216 |
| 3,706,536 | 12/1972 | Greenwood et al. | 422/216 |
| 3,725,248 | 4/1973 | Greenwood et al. | 208/138 |
| 3,882,015 | 5/1975 | Carson | 208/169 |
| 3,981,824 | 9/1976 | Greenwood et al. | 502/37 |
| 4,110,081 | 8/1978 | Millar et al. | 422/216 |
| 4,277,444 | 7/1981 | Van Landeghen | 422/218 X |
| 4,374,095 | 2/1983 | Legg et al. | 422/218 |
| 4,411,869 | 10/1983 | Kroushl et al. | 422/218 X |
| 4,411,870 | 10/1983 | Kroushl et al. | 422/216 X |

Primary Examiner—Barry S. Richman
Assistant Examiner—Brion P. Heaney
Attorney, Agent, or Firm—Thomas K. McBride; William H. Page, II

[57] ABSTRACT

An improved multiple stage reactor system for effecting radial flow contact of a reactant stream with catalyst particles movable as an annular-form bed through said system by gravity flow. The improved multiple stage reactor system may be advantageously employed in the catalytic conversion of hydrocarbons and in particular in the catalytic reforming of a naphtha boiling range charge stock.

9 Claims, 4 Drawing Figures

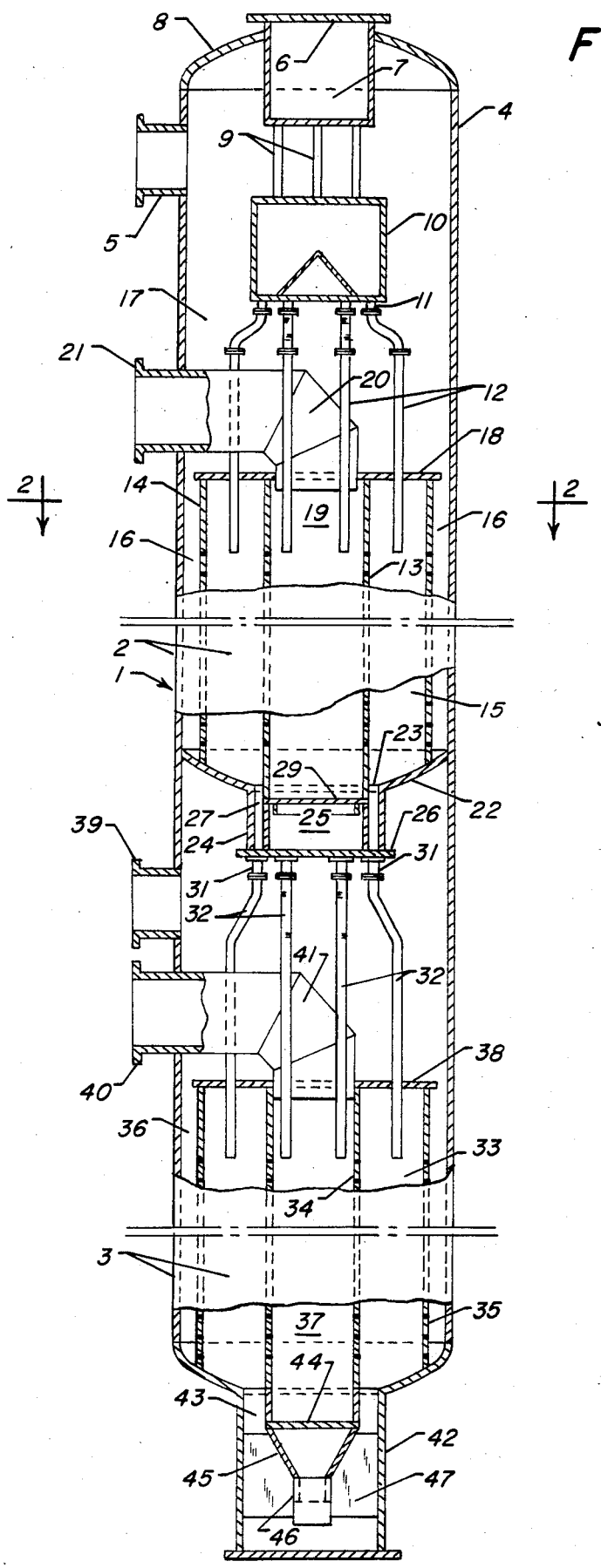
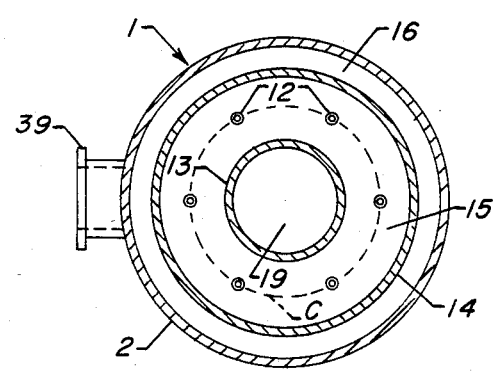
Figure 1
Figure 2

MULTIPLE-STAGE REACTOR SYSTEM FOR A MOVING CATALYST BED

BACKGROUND OF THE INVENTION

The present invention relates to a multiple-stage, radial flow, catalytic reactor system which is particularly useful in the vapor phase conversion of various hydrocarbon feedstocks. The reactor system provides for the processing of a reactant stream through two or more reactor sections which are vertically spaced in an elongated reactor chamber, said reactant stream being processed by contact with catalyst particles that are movable through said reactor sections as an annular-form bed via gravity flow.

Various hydrocarbon conversion processes have heretofore been effected utilizing a reactor system wherein a reactant stream is processed in radial flow through a vertically positioned annular-form catalyst bed—an arrangement that offers many design and operating advantages, particularly with respect to those hydrocarbon conversion processes that are effected in the vapor phase. In these processes, catalyst particles are typically emplaced in a vertically positioned annular-form catalyst retaining section defined by an inner tubular form catalyst retaining screen (generally supported by a perforated or slotted centerpipe) coaxially disposed within a vertically positioned outer tubular form catalyst retaining screen. Illustrative of the typical types of hydrocarbon conversion processes employing such reactor systems are catalytic reforming, catalytic dehydrogenation of paraffins and catalytic dehydrogenation of alkylaromatics.

INFORMATION DISCLOSURE

U.S. Pat. No. 2,683,654 is illustrative of an earlier single stage reactor system through which a reactant stream is caused to flow laterally and radially across a vertically positioned annular-form catalyst bed. The reactor system is designed to accommodate a fixed catalyst bed, the reactant stream being introduced downwardly into the annular-form space created between the reactor walls and the annular-form catalyst bed, and caused to flow radially across the bed into a perforated centerpipe. The reactant stream is then continued downwardly to be discharged from the reactor system. U.S. Pat. No. 3,692,496 describes a somewhat related reactor system in that a reactant stream charged to a reactor chamber is caused to flow radially from an outer annular-form space through an annular-form catalyst bed into an inner or center manifold space. The reactor system is in this case a multiple stage reactor system comprising stacked reactor sections (and consequently stacked annular-form catalyst beds) designed to process catalyst particles downwardly via gravity flow from one annular-form catalyst retaining section to the next lower annular-form catalyst retaining section, the catalyst particles being recovered from the lowermost reactor section for regeneration. A variation of the last-described multiple stage reactor system appears in U.S. Pat. No. 3,725,248 wherein the annular-form catalyst beds are individually contained in side-by-side reaction chambers, and in U.S. Pat. No. 3,882,015 wherein the reactant stream is reversed to flow radially from a center reactant conduit through an annular-form catalyst bed to be recovered in the annular-form space formed by said catalyst bed and the walls of the reactor chamber.

To promote a more uniform flow of catalyst particles through a multiple stage reactor system, it has heretofore been the practice to provide a plurality of catalyst withdrawal conduits uniformly spaced about the bottom of the annular-form catalyst retaining section equidistant from the inner and outer catalyst retaining screens, with the upper end of each conduit being covered by a conical cap designed to allow an equal flow of catalyst particles into said conduit from all directions. This approach, as well as many constructive details of a moving bed reactor such as herein contemplated, is illustrated in U.S. Pat. No. 3,706,536. While this design is effective to promote a more uniform catalyst flow, U.S. Pat. No. 4,110,081 gives recognition to the catalyst stagnation that can occur to the detriment of the overall reactor system. Thus, catalyst particles gravitating through the annular-form catalyst retaining section adjacent to the inner catalyst retaining screen are apt to be held in that position by the inward radial flow of the reactant stream. As the gravitating particles approach the bottom of the catalyst retaining section under the radial flow influence of the reactant stream, access to the aforementioned catalyst withdrawal conduits is somewhat hampered. As a result, said particles tend to become pinned to the bottom portion of the inner catalyst retaining screen and build to a stagnant catalyst mass, generally characterized as having a triangular cross-sectional area, based at the bottom of the catalyst retaining section and tapering upwardly toward said inner screen.

In response to the problem, the aforesaid U.S. Pat. No. 4,110,081 discloses the use of a plurality of catalyst collection scoops, or a single discoid cover plate, just above the plurality of catalyst withdrawal conduits in a manner to direct the removal of catalyst from the annular-form catalyst retaining section through an annular, or nearly annular, opening adjacent to the inner catalyst retaining screen. A major drawback to the design is that a relatively large amount of catalyst is allowed to stagnate in the lower portion of the annular-form catalyst retaining section below the top of the catalyst scoops or discoid plate that forms the annular catalyst passageway. In this area, the catalyst remains exposed to the process vapors and is subjected to excessive coking and deactivation. Aside from a loss of valuable catalyst, such stagnated catalyst may form a mass of coke capable of blocking the flow of catalyst or causing damage to this area of the reactor system.

OBJECTS AND EMBODIMENTS

It is an object of this invention to present an improved multiple stage reactor system for processing a reactant stream in radial flow across a moving annular-form catalyst bed. It is a further object to provide a more uniform flow of catalyst particles through the annular-form catalyst retaining sections of said multiple stage reactor system. It is a still further object to provide an improved catalyst transfer system whereby catalyst particles can move from an uppermost reactor section through said multiple stage reactor system and eliminate, or greatly reduce, any potential for catalyst stagnation in the process. Other objects of this invention include an improved distribution of process vapors across the annular-form catalyst bed.

In one of its broad embodiments, the present invention comprises a multiple stage reactor system for effecting radial flow contact of a reactant stream with catalyst particles movable as an annular-form bed through said system by gravity flow, which comprises in combination: (A) a vertically elongated confined chamber; (B) at least two vertically spaced apart reactor sections in said chamber; (C) at least one of said reactor sections comprising: (i) a bottom enclosed inner tubular-form catalyst retaining screen coaxially disposed within an outer vertically positioned tubular-form catalyst retaining screen to provide an annular-form catalyst retaining section, said catalyst retaining section having a manifold space around the exterior thereof, and within the inner space thereof as defined by said inner catalyst retaining screen; (ii) an upper transverse partition means covering said annular-form catalyst retaining section; (iii) a second transverse partition means below said catalyst retaining section, said second transverse partition means having an opening which provides an annular-form catalyst passageway adjacent to said inner catalyst retaining screen; (iv) a catalyst transfer means comprising: (a) a tubular-form well extending below said second transverse partition means; (b) a bottom transverse partition means supporting said inner catalyst retaining screen in said well to provide an annular-form catalyst collecting zone below said annular-form catalyst retaining section and in communication with said annular-form catalyst passageway; (c) a plurality of catalyst outlet means uniformly spaced in the bottom of said annular-form catalyst collecting zone and adjacent to the inner and outer walls thereof; and (d) a plurality of elongated catalyst transfer conduits connective with said outlet means and with a next catalyst retaining section whereby catalyst particles can move by gravity flow from an upper reactor section to a next lower reactor section; (v) a reactant stream inlet means located in an upper portion of each of said reactor sections, said inlet means being in open communication with the manifold space around the catalyst retaining section therein; and (vi) a reactant stream outlet means from each of said reactor sections which is connective with the upper end of the inner catalyst retaining screen and in open communication with the inner manifold space defined by said screen; (D) a catalyst inlet means connective with the upper portion of said chamber; and (E) a catalyst outlet means connective with the lower portion of said chamber.

In another embodiment, the invention is further characterized in that the lowermost reactor section comprises: (A) a bottom enclosed inner tubular-form catalyst retaining screen coaxially disposed within an outer vertically positioned tubular-form catalyst retaining screen to provide an annular-form catalyst retaining section, said catalyst retaining section having a manifold space around the exterior thereof, and within the inner space thereof as defined by said inner catalyst retaining screen; (B) an upper transverse partition means covering said annular-form catalyst retaining section; and (C) an annular-form catalyst passageway adjacent to and defined by the inner tubular-form catalyst retaining screen and a tubular form catalyst outlet port.

In yet another embodiment, the invention comprises a multiple-stage reactor system for effecting radial flow contact of a reactant stream with catalyst particles movable as an annular-form bed through said system by gravity flow, which comprises in combination: (A) a vertically elongated confined chamber; (B) three vertically spaced apart reactor sections in said chamber; (C) two of said reactor sections comprising: (i) a bottom enclosed inner tubular-form catalyst retaining screen coaxially disposed within an outer vertically positioned tubular-form catalyst retaining screen to provide an annular-form catalyst retaining section, said catalyst retaining section having a manifold space around the exterior thereof, and within the inner space thereof as defined by said inner catalyst retaining screen; (ii) an upper transverse partition means covering said annular-form catalyst retaining section; (iii) a second transverse partition means below said catalyst retaining section and said second transverse partition means having an opening which provides an annular-form catalyst passageway adjacent to said inner catalyst retaining screen; (iv) a catalyst transfer means comprising: (a) a tubular-form well extending below said second transverse partition means; (b) a bottom transverse partition means supporting said inner catalyst retaining screen in said well to provide an annular-form catalyst collecting zone below said annular-form catalyst retaining section and coextensive with said annular-form catalyst passageway; (c) a plurality of catalyst outlet means uniformly spaced in the bottom of said annular-form catalyst collecting zone and adjacent to the inner and outer walls thereof; and (d) a plurality of elongated catalyst transfer conduits connective with said outlet means and with the next lower catalyst retaining section whereby catalyst particles can move by gravity flow from an upper reactor section to a next lower reactor section; (v) a reactant stream inlet means located in an upper portion of each of said reactor sections, said inlet means being in open communication with the manifold space around the catalyst retaining section therein; and (vi) a reactant stream outlet means from each of said reactor sections which is connective with the upper end of the inner catalyst retaining screen and in open communication with the inner manifold space defined by said screen; (D) a catalyst inlet means connective with the upper portion of said chamber; and (E) a catalyst outlet means connective with the lower portion of said chamber.

In still another embodiment, the invention comprises a multiple-stage reactor system for effecting radial flow contact of a reactant stream with catalyst particles movable as an annular-form bed through said system by gravity flow, which comprises in combination: (A) a vertically elongated confined chamber; (B) four vertically spaced apart reactor sections in said chamber; (C) three of said reactor sections comprising: (i) a bottom enclosed inner tubular-form catalyst retaining screen coaxially disposed within an outer vertically positioned tubular-form catalyst retaining screen to provide an annular-form catalyst retaining section, said catalyst retaining section having a manifold space around the exterior thereof, and within the inner space thereof as defined by said inner catalyst retaining screen; (ii) an upper transverse partition means covering said annular-form catalyst retaining section; (iii) a second transverse partition means below said catalyst retaining section and said second transverse partition means having an opening which provides an annular-form catalyst passageway adjacent to said inner catalyst retaining screen; (iv) a catalyst transfer means comprising: (a) a tubular-form well extending below said second transverse partition means; (b) a bottom transverse partition means supporting said inner catalyst retaining screen in said well to provide an annular-form catalyst collecting zone below said annular-form catalyst retaining section and coextensive with said annular-form catalyst passageway; (c) a plurality of catalyst outlet means uniformly spaced in the bottom of said annular-form catalyst collecting zone and adjacent to the inner and outer walls thereof; and (d) a plurality of elongated catalyst transfer conduits connective with said outlet means and with the next lower catalyst retaining section whereby catalyst particles can move by gravity flow from an upper reactor section to a next lower reactor section; (v) a reactant stream inlet means located in an upper portion of each of said reactor sections, said inlet means being in open communication with the manifold space around the catalyst retaining section therein; and (vi) a reactant stream outlet means from each of said reactor sections which is connective with the upper end of the inner catalyst retaining screen and in open communication with the inner manifold space defined by said screen; (D) a catalyst inlet means connective with the upper portion of said chamber; and (E) a catalyst outlet means connective with the lower portion of said chamber.

Other objects and embodiments of the invention will become apparent in the following detailed specification.

SUMMARY OF THE INVENTION

As noted previously, the multiple stage reactor system of the present invention is particularly adaptable for use in the continuous catalytic reforming of a naphtha feedstock at conventional reforming conditions. The continuous reforming process is generally effected in the presence of an alumina-supported platinum catalyst. Typically, the catalyst is a spheroidal catalyst in the 1/32"-⅛" diameter range to provide improved free-flow characteristics and obviate bridging and blocking of the catalyst column gravitating through the reactor system. In connection with the plurality of relatively small diameter catalyst transfer conduits utilized between the reactor sections herein, it is of particular importance that the spheroidal catalyst particles be of a small diameter, preferably less than about ⅛", to enhance the gravity flow from one reactor section to another.

To enable a more thorough understanding of the scope of the present invention, the term "screen" as used in conjunction with describing the annular-form catalyst retaining sections is intended to have a broad meaning including any suitable means for confining catalyst to the catalyst bed while allowing facile flow of the reactants across the bed. Many such screens are known in the art and as the catalyst particles descending through the annular-form catalyst retaining sections are somewhat fragile, such inner and outer catalyst retaining screens are preferably designed to minimize catalyst attrition. One type of such a screen has heretofore been described as comprising flat-faced wires facing the interior of the catalyst retaining section. More specifically, the screen member may comprise parallel, vertically positioned, flat-faced wires that are wedge-shaped and closely spaced to preclude the entrapment and loss of catalyst particles therebetween. The vertically oriented flat-faced wires permit a downward flow of catalyst particles through the annular-form catalyst retaining sections with minimal friction and attrition. The closely spaced, flat-faced, wedge-shaped wires also result in wedge-shaped openings between said wires. Particulates that do pass into the wedge-shaped openings tend not to be retained therein but are released outwardly to substantially obviate clogging of the retaining screens and consequent interruption of the vapor flow across the catalyst bed. The preferred catalyst retaining screens of the flat-faced wire type are more fully described in the aforementioned U.S. Pat. No. 3,706,536.

Alternatively, the screens may comprise punch plates, perforated plates, or perforated pipes. The perforations are sized to inhibit passage therethrough of catalyst particles while allowing facile flow of reactants through the screen. The perforations may comprise any suitable shape including circles, squares, rectangles, triangles, narrow horizontal or vertical slits, etc.

It should be noted that screens which may be employed in the present invention are not limited to cylindrical screens alone. Rather, the screens may comprise a group of planar segments connected in such a manner as to create a cylindrical form-like particle retaining structure. As opposed to planar elements, the screen may alternatively comprise a group of scallop-shaped elements such as the screens disclosed in U.S. Pat. No. 2,683,654 and more recent U.S. Pat. No. 4,110,081. This scalloped configuration may have various arrangements as disclosed in U.S. Pat. No. 4,167,553. It should be further recognized then that the actual annular fluid distribution volume and the cylindrical distribution volume shapes will be determined by the particular design of the catalyst retention screens. Accordingly, it should be recognized that the term "tubular-form" as applied herein to the catalyst retaining screens of the invention is intended to include any suitable cross-sectional configuration, including any combination of circular, angular, or scalloped configurations, and the annular-form catalyst retaining section, as well as the outer annular-form reactant distribution zone, will have a cross-sectional configuration in accordance therewith. The scalloped configuration, particularly with regard to the outer catalyst retaining screen, is one preferred cross-sectional configuration, especially in combination with an inner catalyst retaining screen of circular configuration substantially as shown in the aforementioned U.S. Pat. No. 4,110,081.

BRIEF DESCRIPTION OF THE DRAWING

In further describing the present inventive concept, reference will be made to the accompanying drawings which serve to illustrate one or more embodiments thereof. Although the drawing depicts a specific configuration for the multiple-stage reactor system of the present invention, as previously set forth above, such a reactor system may have a varying configuration suited to the specific circumstances prevailing in a particular application and there is no intent to limit the broad application of the present invention to the exemplary embodiments discussed hereinafter. Furthermore, the figure in the drawings depict a simplified schematic of the multiple-stage reactor system of the present invention in which only principal items and pieces are shown. Details such as miscellaneous pumps, startup lines, valving, manway hatches, access ports, and other similar items have been omitted as being nonessential to a clear understanding of the inventive reactor system. The utilization of such appurtenances, to modify the illustrated reactor system, is well within the purview of one having ordinary skill in the art, and will not remove the resulting invention beyond the scope and spirit of the appended claims.

FIG. 1 depicts a lateral cross-section of the reactor system of the present invention entirely enclosed within elongated confined chamber 1. As can be readily seen, chamber 1 encloses two vertically spaced apart reactor sections 2 and 3. The cross-sectional area serves to disclose the internals within reactor sections 2 and 3 which include the catalyst retaining screens, catalyst transfer conduits, and reactor transfer conduits.

FIG. 2 is a sectional view looking downward on reactor section 2. FIG. 2 shows the location of the catalyst distribution conduit relative to the catalyst screens.

FIG. 4 allows a detailed view of the tubular form well and associated items for the withdrawal of catalyst.

Figure 3:
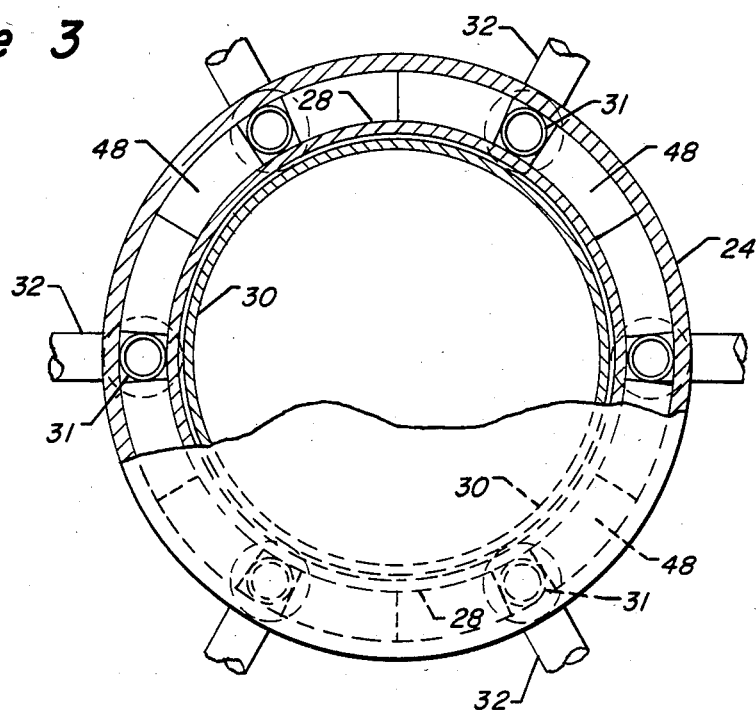
FIG. 3 depicts a sectional view looking downward on the lower portion of reactor section 2. Specifically, the location of the catalyst withdrawal conduits within a tubular form well is disclosed.

As noted above, the reactor system depicted in FIGS. 1–4 is not intended to limit the scope of the present invention to the embodiments disclosed therein. Additionally, only the major items of construction have been depicted, the addition of minor items normally associated with a reactor system being well within the purview of one of ordinary skill in the art.

DETAILED DESCRIPTION OF THE DRAWING

Referring then in particular to the drawing, there is shown a vertically elongated confined chamber or vessel 1 enclosing two vertically spaced apart reactor sections generally indicated at 2 and 3. At the upper end of vessel 1, above the first reactor section 2, is a heat exchanger section 4 having a reactant stream inlet port 5 and catalyst inlet port 6. The last-named port 6 leads to a catalyst inlet section 7 suspended from a flange 8, the catalyst being distributed from said inlet section into a plurality of catalyst transfer tubes 9. Catalyst transfer tubes 9 discharge the catalyst into a redistribution section 10 having a plurality of uniformly spaced apart outlet means 11 connecting with catalyst transfer conduits 12. It should be noted that a reactant stream, preheated and introduced via inlet port 5 will pass in contact with the plurality of catalyst transfer tubes 9 to effect indirect heat exchange with the catalyst particles passing therethrough. The catalyst so preheated and, in the presence of hydrogen, is preferably reduced in tube 9 and in the catalyst redistribution section 10. For example, in the previously mentioned catalytic reforming of a naphtha feedstock, fresh and/or regenerated platinum-containing reforming catalysts can be introduced via inlet port 6 and passed through the catalyst transfer tubes 9 in the presence of hydrogen, the catalyst being heated and reduced therein by means of the indirect heat exchange with the naphtha feedstock preheated and introduced by way of inlet port 5 typically at a temperature of about 900°–1000° F. or more.

The upper reactor section 2 is provided with an inner tubular form catalyst-retaining screen 13 the bottom of which is enclosed. Retaining screen 13 is coaxially disposed within an outer vertically positioned tubular form catalyst-retaining screen 14 to provide an annular-form catalyst-retaining section 15. It will also be noted that there is an outer annular-form reactant distribution zone 16 defined by the perimeter of outer catalyst-retaining screen 14 and the wall of vessel 1. The reactant stream from the upper passageway section 17 is collected and distributed throughout annular-form reactant distribution zone 16. The reactants then flow from annular-form reactant distribution zone 16 and radially across the catalyst within catalyst-retaining section 15. Cover plate 18 is provided over the annular form catalyst-retaining section 15 in order to assure that the reactants flow radially across the catalyst bed and not downward from above the bed. It should be further noted that the reactants flow in a radial pattern across the catalyst bed while the catalyst is gravitating through the retaining section 15 and that the catalyst within section 15 is not stationary. As indicated earlier, the description "tubular-form" as applied to the retaining screens mentioned in the preceding paragraph is intended to include any suitable cross-sectional configuration, including any combination of circular, angular, or scalloped configurations, and the annular-form catalyst-retaining section, as well as the outer annular form reactant distribution zone, will have a cross-sectional configuration in accordance therewith. The scalloped configuration, particularly with regard to the outer catalyst-retaining section, is one preferred cross-sectional configuration, especially in combination with an inner catalyst-retaining screen of circular configuration substantially as shown in the aforementioned U.S. Pat. No. 4,110,081.

Regardless of the exact configuration of the tubular form catalyst-retaining screens, a plurality of spaced catalyst conduit means 12 are provided to effect a uniform transfer of catalyst from redistribution section 10 to the annular form catalyst-retaining section 15. The number of transfer conduits employed will depend on the diameter of the reactor section. Preferably, the radial distance between catalyst-retaining screens 13 and 14 will be relatively short thereby making catalyst-retaining section 15 relatively narrow in order to minimize the pressure drop of the reactant streams passing through the catalyst bed to the inner manifold space 19 defined by the inner catalyst-retaining screen 13. Accordingly, a single circular orientation of catalyst transfer conduits 12 will generally suffice for the uniform distribution of catalyst into the catalyst-retaining section. Referring to FIG. 2, a particularly preferred positioning arrangement can be seen. It can be seen that the catalyst transfer conduits 12 are arranged in a circular orientation along circle 'C' indicated by the dashed line. Circle 'C' is spaced with respect to catalyst-retaining screens 13 and 14 in such a fashion so as to allow discharging of the catalyst downwardly such that approximately half of the catalyst will be discharged within circle 'C' and the remainder discharged outside of said circle.

Reactant stream withdrawal conduit 20 connects the upper end of the inner catalyst-retaining screen 13 with an outlet port 21. The reactor system of the present invention thus provides for the removal of the reactant stream from the top of the inner manifold space 19 as opposed to the more common practice of removing said stream from the bottom thereof. By removing the reactant stream from the top of the inner manifold space 19 as opposed to the bottom thereof, a more equal pressure drop along the length of the catalyst bed may be achieved and consequently a better distribution of the reactant stream through the catalyst bed will result. The improved pressure drop along the length of the catalyst bed results from the fact that the velocity head of the reactant stream in the inner manifold space 19 balances the velocity head of the reactant stream in the annular-form reactant distribution zone 16. This balancing provides a more uniform pressure drop across the entire length of the annular form catalyst bed.

This phenomenon can be more readily understood by considering the velocity heads of the reactant stream at two different locations along the length of the catalyst bed. At the uppermost portion of reactant distribution zone 16, the velocity head of the reactant stream is at a maximum. At the lower terminal end of distribution zone 16, the velocity head of the reactants is 0. Accordingly, there is a gradual deceleration of the reactant stream as it passes from the inlet of distribution zone 16 to the lower terminal end of distribution zone 16. This deceleration results in a corresponding increase in pressure from the inlet to distribution zone 16 to the lower terminal portion of distribution zone 16. To offset this pressure gradient, it is desirable to withdraw the reactants from inner manifold space 19 in such a fashion that there exists an increasing pressure gradient from the top outlet of inner manifold space 19 to the lower terminal portion of manifold space 19. This is achieved if the reactants are withdrawn from the upper portion of manifold space 19 as opposed to the more common practice of withdrawing the reactants from the lower portion thereof. By withdrawing the reactants from inner manifold space 19, the velocity head at the upper end of manifold space 19 is at a maximum while the velocity head of the reactants at the lower terminal portion of manifold space 19 is substantially 0. Thus, the velocity heads within distribution zone 16 and manifold space 19 are approximately balanced with the lowest velocity head occurring at the lower end of distribution zone 16 and the lower end of manifold space 19 and the highest velocity head occurring at the upper inlet to distribution zone 16 and the upper outlet of manifold space 19. Correspondingly, the highest pressures occur at the lower end of distribution zone 16 and manifold space 19 while the lowest pressure exists at the upper end of zone 16 and the upper end of manifold space 19. Thus, the pressure gradients along the length of the catalyst bed are relatively matched with the highest pressures located at the lower end of the catalyst bed and the lower pressures being located at the upper end of the catalyst bed. The result is a relatively balanced pressure drop along the length of the catalyst bed thereby assuring better distribution of the reactants across the catalyst bed and more efficient catalyst use.

Figure 4:
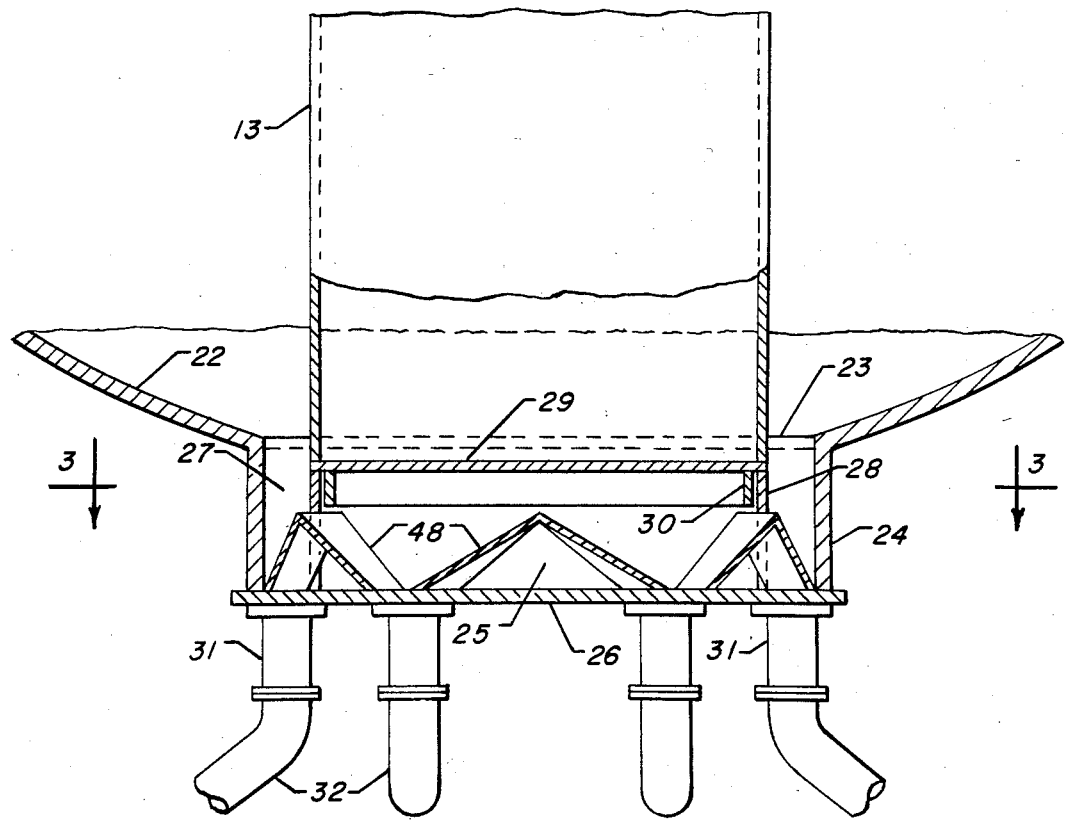
FIG. 4 is a lateral sectional view of the lower portion of reactor section 2.

Lower head partition means 22 of reactor section 2 provides an annular form catalyst passageway 23 immediately adjacent to the inner catalyst-retaining screen 13. A catalyst transfer section generally indicated at 24 is provided extending below said partition means 22, said transfer section comprising the tubular form well 25 suspended from the inner perimeter of said partition means 22. Inner catalyst-retaining screen 13 is supported on transverse partition 26 at the bottom of tubular form well 25 and provides an annular-form catalyst collecting zone 27 below the annular form catalyst-retaining section 15 and coextensive with the annular-form catalyst passageway 23. FIGS. 3 and 4 of the drawing are illustrations of one preferred arrangement of said catalyst transfer section 24, and for supporting said inner catalyst-retaining screen 13. Referring then to FIGS. 3 and 4 there is shown a tubular form socket means 28 affixed to the bottom transverse partition 26. The inner catalyst-retaining screen 13 is in turn provided with a bottom transverse partition means 29 and then extension 30 is affixed to the bottom of said partition means 29 whereby said inner screen 13 is insertably mounted in said socket means 28. Catalyst transfer section 24 further comprises catalyst outlet means 31 from the bottom of the annular-form catalyst collecting zone 27, said outlet means being uniformly spaced apart to promote a uniform withdrawal of catalyst from annular-form catalyst-retaining section 15. As shown in FIG. 3 of the drawing, sloped baffle means 48 are provided within the annular-form catalyst collecting zone 27 interspersed between the catalyst outlet means 31 whereby gravitating catalyst particles are funneled into said outlets from the annular-form catalyst passageway 23. The transition from the annular-form catalyst passageway 23 to the plurality of catalyst conduits 32 is desirable in that the cross-sectional area of the catalyst passageway between reactor sections 2 and 3 is reduced and the leakage of reactor vapor between said reactor sections via said passageway is minimized accordingly. In addition, it should be noted that there is no stagnant catalyst near outer screen 14 because the radial vapor flow pushes the catalyst toward the centerpipe 13 and gravity pulls the catalyst into annular-form catalyst collecting zone 27. It will be therefore appreciated that the foregoing catalyst transfer section 24 allows little if any stagnation of catalyst at any point in transfer from the annular-form catalyst-retaining section 15 to the next lower catalyst-retaining section 33. Referring back to FIG. 1, it can be seen that open-ended catalyst conduit means 32 which extend downwardly from catalyst outlet means 31 allows the transfer and uniform distribution of catalyst from catalyst-retaining section 15 to the next lower annular-form catalyst-retaining section 33 within reactor section 3.

The construction and arrangement of the lowermost reactor section 3 is somewhat similar to that of reactor section 2 in that an inner tubular form catalyst-retaining screen 34 is coaxially disposed within an outer vertically positioned tubular form catalyst-retaining screen 35 to provide the aforementioned annular-form catalyst-retaining section 33. Reactor section 3 further comprises an outer annular-form reactant stream distribution zone 36 around the full length of said catalyst-retaining section 33, an inner manifold space 37 defined by said inner catalyst-retaining screen 34, and a cover plate 38 over catalyst-retaining section 33 to preclude any direct overhead flow of the reactant stream into said catalyst-retaining section. A reactant stream inlet port 39 is in open communication with the reactant stream distribution zone 36, and a reactant stream outlet port 40 is shown in open communication with the inner manifold space 37 via a reactant stream withdrawal conduit 41. As with reaction section 2, the reactant stream outlet port 40 of section 3 is located in the upper portion thereof to allow the balancing of the velocity heads in the reactant stream distribution zone 36 and the inner manifold space 37.

Reactant streams withdrawn from reactor section 2 by way of outlet port 21 may typically be processed through a heating means, not shown, prior to reintroduction into reactor section 3 through inlet port 39. Accordingly, an effluent reactant stream from the outlet port 21 of reactor section 2 will typically be reheated and introduced into reactor section 3 and distribution zone 36 by way of inlet port 39, the reactant stream then passing across catalyst-retaining section 33 in radial flow to be recovered in the inner manifold space 37 and subsequently discharged overhead by way of conduit 41 and outlet port 40.

A tubular form catalyst outlet port 42 is provided from the bottom of the lowermost reactor section 3. The lower extremity of the inner catalyst-retaining screen 34 is coaxially mounted within said outlet port to provide an annular-form catalyst passageway 43 immediately adjacent to said inner catalyst-retaining screen 34 and below catalyst-retaining section 33. The lower extremity of the inner catalyst-retaining screen 34 is enclosed by transverse partition means 44 having a tapered plug 45 whereby said screen is insertably mounted in a socket means 46, thus fully supporting the inner catalyst retaining screen 34. Socket means 46 is concentrically disposed within outlet port 42 and affixed to the walls thereof by means of a plurality of radially spaced apart, vertically oriented fins 47.

To more fully illustrate the utility of the multiple-stage reactor system of the invention, the following description of a catalytic reforming operation as affected in the reactor set forth in FIG. 1 of the drawing is offered. For purposes of this illustration, it may be assumed that a straight run gasoline fraction boiling in the 200°–400° F. range is being charged to the reactor by way of inlet port 5 in admixture with a hydrogen-rich recycle stream. Catalytic reforming of the gasoline fraction in admixture with hydrogen is effected in contact with a suitable spheroidal reforming catalyst introduced into the top of the stacked reactor system by way of catalyst inlet port 6. It may also be assumed that the spheroidal catalyst particles entering through inlet port 6 will do so in the presence of hydrogen which is utilized to provide a fluidized lift for said particles from fresh catalyst storage means and/or suitable catalyst regeneration means. Accordingly, the charge stream entering the inlet port 5 at a temperature in the range of from about 900°–1100° F. will pass around the transfer tubes 9 to effect a heat exchange with the catalyst particles contained therein. The catalyst is thereby heated and reduced in the presence of the fluidized lift hydrogen. The catalyst is then redistributed from section 10 into catalyst transfer conduits 12 and the catalyst-retaining section 15. In catalyst-retaining section 15, the catalyst particles come into contact with the reactant stream passing in radial flow from the reactant stream distribution zone 16 as said reactant stream passes across the catalyst bed into the inner manifold space 19.

After passing into inner manifold space 19, the reactant stream from reactor section 2 is directed upwardly from the inner manifold space 19 for recovery through outlet port 21. As previously mentioned above, this arrangement provides a more uniform distribution of the reactant stream across the catalyst bed located within catalyst-retaining section 15. This results from the velocity head of the reactant stream in the inner manifold space 19 being in balance with the velocity head of the reactant stream in distribution zone 16 whereby a substantially uniform pressure drop is achieved across the entire length of the annular-form catalyst bed 15.

Because the overall reforming process is endothermic in nature, the effluent from reactor section 2 is preferably reheated prior to being introduced into reactor section 3. Generally the heating should be sufficient to raise the reactant stream to a temperature on the order of about 900° F. or more. The reheated reactant stream is introduced via inlet port 39 from which it passes into the annular-form distribution zone 36. The reactants then flow through distribution zone 36 radially inward contacting the catalyst emplaced within the annular-form catalyst-retaining section 33 similar to the reactant flow described in reference to reactor section 2. The reactant stream then passes into inner manifold space 37 and is withdrawn by way of outlet port 40.

The catalyst particles gravitating through the annular-form catalyst-retaining section 15 under the influence of the inward radial flow of the reactant stream, are directed into the annular-form passageway 23 immediately adjacent to the inner catalyst-retaining screen 13. The catalyst particles then continue downwardly through the annular-form catalyst collecting zone 27 which provides an uninhibited transition from a complete annulus to the plurality of catalyst transfer conduits. By means of the uninhibited transition from annulus to plurality of catalyst transfer conduits, cross-sectional area of the catalyst passageway between reactor sections is minimized and this in turn minimizes the leakage of process vapors through said passageway. This transition is effected with little if any stagnation of catalyst by means of the sloped baffles 48 interspersed between the catalyst outlet means 31 and extending to the perimeter thereof as more clearly defined in FIGS. 3 and 4 of the drawing, said catalyst outlet means being preferably of a diameter substantially equivalent to the width of said annular-form catalyst collecting zone.

The gravitating catalyst particles in the lower catalyst-retaining section 33 are directed to the annular-form catalyst passageway 43, said passageway being formed by the bottom portion of the inner catalyst screen 34 and the walls of the tubular form catalyst outlet port 42. The vertically positioned baffles 47 while providing support for the inner catalyst-retaining screen 34, also function to establish plug-flow of the catalyst in the annular passageway prior to discharge into a catalyst collection means, not shown. The catalyst collection means may be in open communication with the outlet port 42 and may typically provide for purging of the catalyst with the hydrogen-rich recycle stream prior to discharging the same for recycle and/or regeneration in keeping with prior art practice.

We claim as our invention:

1. A multiple-stage reactor system for effecting radial flow contact of a reactant stream with catalyst particles movable as an annular-form bed through said system by gravity flow, which comprises in combination:
(A) a vertically elongated confined chamber having vertical walls;
(B) at least two vertically spaced apart reactor sections in said chamber;
(C) at least the upper one of said reactor sections comprising:
 (i) an enclosed inner tubular-form catalyst retaining screen coaxially disposed within an outer vertically positioned tubular-form catalyst retaining screen to form an annular-form catalyst retaining section, a bottom enclosing said annular-form catalyst retaining section, said catalyst retaining section having an inlet manifold space around the exterior thereof as defined by the chamber walls and said outer cataylst retaining screen, and an outlet manifold space within the inner space defined by said inner catalyst retaining screen;
 (ii) an upper annular shaped partition means covering the top of sais annular-form catalyst retaining section;
 (iii) a second transvers partition means below said catalyst retaining section and forming said bottom of said catalyst retaining section, said second transverse partition means being connected to said chamber walls and having an opening through which said inner catalyst retaining screen extends to form an annular-form catalyst passageway between said second transverse partition and said inner catalyst retaining screen;
 (iv) a catalyst transfer means comprising:

(a) a tubular-form well extending below said opening in said second transverse partition means;
(b) a bottom transverse partition means supporting said inner catalyst retaining screen in said well to form an annular-form catalyst collecting zone bounded by said well and said bottom transverse partition means, said catalyst collecting zone being below said annular-form catalyst retaining section and in communication with said annular-form catalyst passageway;
(c) a plurality of catalyst outlet means uniformly circumferentially spaced in the bottom of said annular-form catalyst collecting zone; and
(d) an elongated catalyst transfer conduit connected to each of with said outlet means and with a next lower catalyst retaining section whereby catalyst particles can move by gravity flow from said upper reactor section to a next lower reactor section;
(v) a reactant stream inlet means located in an upper portion of each of said at least one reactor sections, said inlet means being in open communication with said inlet manifold space around the exterior of said catalyst retaining sections therein; and
(vi) a reactant stream outlet means from each of said at least one reactor sections which is connected with the upper end of the inner catalyst retaining screen and in open communication with said outlet manifold space defined by said inner catalyst retaining screen;
(D) a catalyst inlet means connected with the upper portion of said chamber; and
(E) catalyst withdrawal means connected with the lower portion of said chamber.

2. The reactor system of claim 1 further characterized in that said catalyst transfer means further comprises sloped baffle means located on the bottom of said annular-form catalyst collecting zone and interspersed between said outlet means whereby gravitating catalyst particles are funneled into said outlet means.

3. The reactor system of claim 1 further characterized in that said tubular-form well has concentrically disposed therein a tubular-form socket means attached to said second transverse partition means and coextensive with the inner catalyst retaining screen, said inner screen being insertably mounted in said socket means to thereby support said inner catalyst retaining screen.

4. The reactor system of claim 1 further characterized in that the lowermost reactor section comprises:
(A) an enclosed inner tubular-form catalyst retaining screen coaxially disposed within an outer vertically positioned tubular-form catalyst retaining screen to form a lowermost annular-form catalyst retaining section, a bottom wall of said chamber enclosing said lowermost annular-form catalyst retaining section wherein said bottom wall is connected to said vertical walls said lowermost catalyst retaining section having an inlet manifold space around the exterior thereof as defined by said vertical walls and said outer catalyst retaining screen of said lowermost reactor section, and an outlet manifold space within the inner space defined by said inner catalyst retaining screen;
(B) an upper annular shaped transverse partition means covering the top of said lowermost annular-form catalyst retaining section;
(C) an annular-form catalyst passageway adjacent to and defined by the inner tubular-form catalyst retaining screen and said bottom wall in open communication with said catalyst withdrawal means wherein said inner catalyst retaining screen of said lowermost reactor section extends through an opening in said bottom wall;
(D) a reactant stream inlet means located in an upper portion of the lowermost reactor section, said inlet means being in open communication with said inlet manifold space around the exterior of said catalyst retaining section therein; and
(E) a reactant stream outlet means from the lowermost reactor section which is connective with the upper end of the inner catalyst retaining screen and in open communication with said outlet manifold space defined by said inner catalyst retaining screen.

5. The reactor system of claim 4 further characterized in that the inner catalyst retaining screen of the lowermost reactor section is supported by a support means located within the catalyst withdrawal mesns.

6. The reactor system of claim 5 further characterized in that said catalyst outlet means is a tubular-form catalyst withdrawal means extending below said opening in said bottom wall, a lower extremity of the inner catalyst retaining screen of the lowermost reactor section being supported within said withdrawal means by said support means to form an annular-form catalyst flow path immediately below the annular-form catalyst passageway and adjacent to said inner catalyst retaining screen.

7. The reactor system of claim 6 further characterized in that the lower extremity of the inner catalyst retaining screen of the lowermost reactor section is enclosed by a partition comprising a tapered plug which plug is insertably mounted in said support means, said support means comprising a socket concentrically disposed within said tubular-form catalyst withdrawal means and affixed to the walls thereof by means of a plurality of radially spaced apart, vertically oriented baffle means.

8. A multiple-stage reactor system for effecting radial flow contact of a reactant stream with catalyst particles movable as an annular-form bed through said system by gravity flow, which comprises in combination:
(A) a vertically elongated confined chamber having vertical walls;
(B) three vertically spaced apart reactor sections in said chamber;
(C) the upper two of said reactor sections comprising:
(i) an enclosed inner tubular-form catalyst retaining screen coaxially disposed within an outer vertically positioned tubular-form catalyst retaining screen to form an annular-form catalyst retaining section a bottom enclosing said annular-form catalyst retaining section, said catalyst retaining section having an inlet manifold space around the exterior thereof as defined by the chamber wall and said outer catalyst retaining screen, and an outlet manifold space within the inner space as defined by said inner catalyst retaining screen;
(ii) an upper annular-shaped transverse partition means covering the top of said annular-form catalyst retaining section;
(iii) a second transverse partition means below said catalyst retaining section and forming said bottom of said catalyst retaining section, said second transverse partition means being connected to said chamber walls and having an opening through which said inner catalyst retaining screen extends to form an annular-form catalyst passageway adjacent to between said second transverse partition and said inner catalyst retaining screen;

(iv) a catalyst transfer means comprising:
  (a) a tubular-form well extending below said openning in said second transverse partition means;
  (b) a bottom transverse partition means supporting said inner catalyst retaining screen in said well to form an annular-form catalyst collecting zone bounded by said well and said bottom transverse partition means, said catalyst collecting zone being below said annular-form catalyst retaining section and in communication with said annular-form catalyst passageway;
  (c) a plurality of catalyst outlet means uniformly circumferentially spaced in the bottom of said annular-form catalyst collecting zone; and
  (d) an elongated catalyst transfer conduit connected to each of said outlet means and with the next lower catalyst retaining section whereby catalyst particles can move by gravity flow from an upper reactor section to a next lower reactor section;
(v) a reactant stream inlet means located in an upper portion of each of said at least two upper reactor sections, said inlet means being in open communication with said inlet manifold space around the exterior of said catalyst retaining section therein; and
(vi) a reactant stream outlet means from each of said at least two upper reactor sections which is connected with the upper end of the inner catalyst retaining screen and in open communication with said outlet manifold space defined by said inner catalyst retaining screen;
(D) a catalyst inlet means connected with the upper portion of said chamber; and
(E) a catalyst withdrawal means connective with the lower portion of said chamber.

9. A multiple-stage reactor system for effecting radial flow contact of a reactant stream with catalyst particles movable as an annular-form bed through said system by gravity flow, which comprises in combination:
(A) a vertically elongated confined chaamer having vertical walls;
(B) four vertically spaced apart reactor sections in said chamber;
(C) the upper three of said reactor section comprising:
  (i) an enclosed inner tubular-form catalyst retaining screen coaxially disposed within an outer vertically positioned tubular-form catalyst retaining screen to form an annular-form catalyst retaining section, a bottom enclosing said annular-form catalyst retaining section, said catalyst retaining section having an inlet manifold space around the exterior thereof as defined by the chamber walls and said outer catalyst retaining screen: and an outlet manifold space within the inner space defined by said inner catalyst retaining screen;
  (ii) an upper annular shaped transverse partition means covering the top of said annular-form catalyst retaining section;
  (iii) a second transverse partition means below said catalyst retaining section and forming said bottom of said catalyst retaining section, said second transverse partition means being connected to said chamber walls and having an opening through which said inner catalyst retaining screen extends to form an annular-form catalyst passageway adjacent to between said second transverse partition and said inner catalyst retaining screen;
  (iv) a catalyst transfer means comprising:
    (a) a tubular-form well extending below said opening of said second transverse partition means;
    (b) a bottom transverse partition means supporting said inner catalyst retaining screen in said well to form an annular-form catalyst collecting zone bounded by said well and said bottom transverse partition means, said catalyst collecting zone being below said annular-form catalyst retaining section and in communication with said annular-form catalyst passageway;
    (c) a plurality of catalyst outlet means uniformly circumferentially spaced in the bottom of said annular-form catalyst collecting zone; and
    (d) an elongated catalyst transfer conduit connected to each of said outlet means and with the next lower catalyst retaining section whereby catalyst particles can move by gravity flow from an upper reactor section to a next lower reactor section;
  (v) a reactant stream inlet means located in an upper portion of each of said at least three upper reactor sections, said inlet means being in open communication with said inlet manifold space around the exterior of said catalyst retaining section therein; and
  (vi) a reactant stream outlet means from each of said at least three upper reactor sections which is connected with the upper end of the inner catalyst retaining screen and in open communication with said outlet manifold space defined by said inner catalyst retaining screen;
(D) a catalyst inlet means connected with the upper portion of said chamber; and
(E) a catalyst withdrawal means connected with the lower portion of said chamber.

* * * * *